United States Patent [19]
Helmreich et al.

[11] Patent Number: 5,300,625
[45] Date of Patent: Apr. 5, 1994

[54] HETEROAROMATIC POLYETHER

[75] Inventors: Brigitte Helmreich, Garching; Klaus Burger, Kranzberg; Gerhard Maier; Reinhold Hecht, both of Bayreuth; Oskar Nuyken, München, all of Fed. Rep. of Germany

[73] Assignee: Hoechst Aktiengesellschaft, Frankfurt am Main, Fed. Rep. of Germany

[21] Appl. No.: 819,061

[22] Filed: Jan. 10, 1992

[30] Foreign Application Priority Data

Jan. 14, 1991 [DE] Fed. Rep. of Germany ....... 4100802

[51] Int. Cl.$^5$ ............................................. C08G 65/00
[52] U.S. Cl. .................... 528/211; 528/125; 528/128; 528/171; 528/172; 528/174; 528/205; 528/219; 528/392; 528/403; 528/406; 528/407
[58] Field of Search ............ 528/211, 205, 219, 125, 528/128, 171, 172, 174, 403, 406, 407, 392

[56] References Cited

U.S. PATENT DOCUMENTS 4,843,143 6/1989 Culbertson et al. ................ 528/211

FOREIGN PATENT DOCUMENTS 0010652 5/1980 European Pat. Off. .
0161453 11/1985 European Pat. Off. .
0275417 7/1988 European Pat. Off. .

OTHER PUBLICATIONS

Chemical Abstracts 109:124415c (corresponding to EP-A-0 275 417), (Jun. 1988).
Chemical Abstracts 93:169664a (corresponding to EP-A-0 010 652) (Oct. 1978).
Chemical Abstracts 104:69338z (corresponding to EP-A-0 161 453) (Oct. 1985).
Patent Abstracts of Japan, vol. 13, No. 592 (C-671)(3940), Dec., 1989.
Soviet Patent Abstracts, Week 8539, issued Nov. 8, 1985.
Patent Abstracts of Japan, vol. 13, No. 592 (C-671)(3940) Dec., 1989.

*Primary Examiner*—Harold D. Anderson
*Attorney, Agent, or Firm*—Curtis, Morris & Safford

[57] ABSTRACT

Polyethers which contain recurring units of the formula I

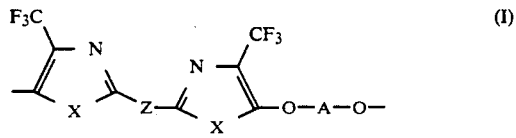

in which
A is a divalent aryl or heteroaryl radical,
X is O, S or NR,
Z is a divalent aryl or heteroaryl radical or an alkynyl, azo or ($CF_2$) group, and
R is aryl are synthesized. The polyethers can be used as thermoplastics for the production of injection-molded articles, extrudates, polymer blends and coatings and for the production of films and membranes from solution.

8 Claims, No Drawings

HETEROAROMATIC POLYETHER

The invention relates to novel heteroaromatic polyethers and polyether ketones, a process for their preparation and to their use.

It is generally known that polymers containing aromatics in the main chain are distinguished by good mechanical properties, high heat deformation resistance and resistance to oxidation and various chemicals. It is also generally known that the inflammability of polymers can be reduced by incorporation of heteroaromatic groups. It is furthermore known that polycondensates of aliphatic or alicyclic diol, dithiol or diamino compounds with bis-(4-fluoro-5-trifluoromethyl-oxazolyl)-phenylene or bis-(4-fluoro-5-trifluoromethyl-thiazolyl)-phenylene are virtually insoluble (K. Geith, Dissertation 1988, TU Munich).

For some fields of use, for example for coatings, the profile of properties of the abovementioned polymers is still in need of improvement, for example in respect of solubility.

The object is therefore to synthesize suitable polymers having improved solubility.

The invention relates to polyethers comprising recurring units of the formula I

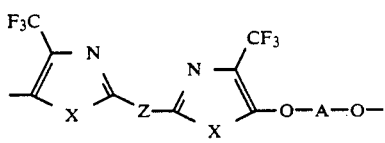

in which
A is a divalent aryl or heteroaryl radical,
X is O, S or NR,
Z is a divalent aryl or heteroaryl radical or the ethinylene, azo or $(CF_2)_n$ group, wherein n is an integer from 1 to 4 and
R is aryl, preferably phenyl.

Suitable divalent arylene radicals A are 1,2-, 1,3- and 1,4-phenylene, 2,6-naphthylene and ring-alkylated (alkyl groups having 1 to 4 carbon atoms) or ring-halogenated (fluorine, chlorine or bromine) derivatives thereof, as well as structural units of the formula:

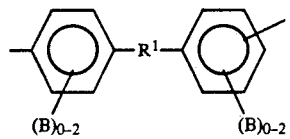

in which $R^1$ is $CH_2$, O, CO, $SO_2$, $C(CH_3)_2$, $C(CF_3)_2$, phenylene,

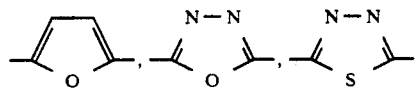

or a direct bond, and B is a halogen or $C_1$-$C_4$-alkyl and the individual phenylene rings are substituted by 0, 1 or 2 groups B.

Suitable divalent heteroarylene radicals A are:

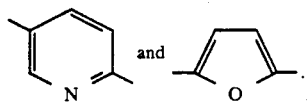

Referred radicals A, however, are arylene radicals, in particular those of the formula

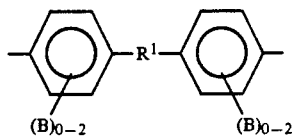

in which $R^1$ is $CH_2$, O, CO, $SO_2$, $C(CH_3)_2$, $C(CF_3)_2$, phenylene,

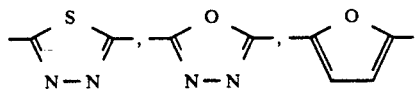

or a direct bond, and B, if present, is halogen, preferably Cl or Br, or $C_1$-$C_4$-alkyl, preferably $CH_3$.

The radicals B are preferably in the 3- or 3,5-position relative to the bridge $R^1$.

X is preferably O. Suitable radicals Z are, for example,

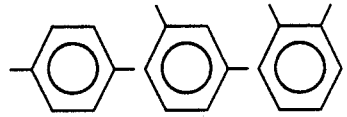

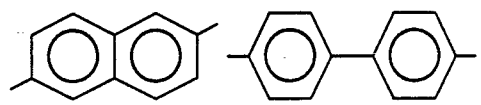

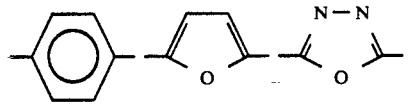

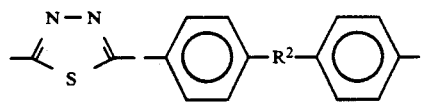

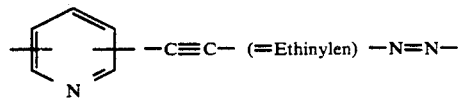

oder $-(CF_2)_{1-4}-$, in which $R^2$ is $CH_2$, O, CO, $SO_2$, $C(CH_3)_2$ or $C(CF_3)_2$.

The radical Z is preferably phenylene.

Particularly preferred polyethers or polyether ketone according to the invention are those containing recurring units of the formula Ia:

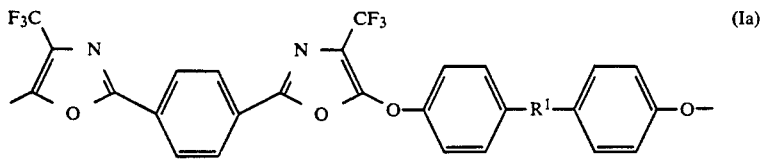

(Ia)

in which $R^1$ is $CH_2$, CO, $C(CH_3)_2$ or $C(CF_3)_2$.

The polyethers according to the invention can be prepared by processes which are known per se, thus, for example, by nucleophilic polycondensation of fluorine compounds of the formula II

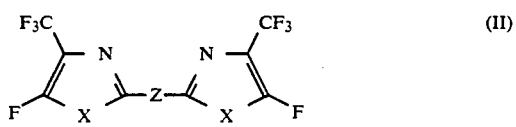

(II)

in which X and Z have the abovementioned meaning, with aromatic or heteroaromatic dihydroxy compounds of the formula III

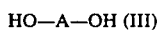  (III)

in which A has the abovementioned meaning, in the presence of a base.

The reaction is preferably carried out in organic solvents which are strongly polar but are inert under the reaction conditions, such as dimethyl sulfoxide, at temperatures of 50°–200° C., preferably at 60°–150° C.

Bases which are preferably to be employed are trialkylamines.

It is to be emphasized that the preparation of the polymers according to the invention proceeds without the formation of relatively large amounts of by-products. The nucleophilic polycondensation is therefore distinctly superior industrially to the known cyclizing polycondensation reactions, which often lead to undesirable chain branchings and crosslinkings.

Some of the compounds of the formula II are known (Burger et al., Synthesis (3) 1988, 199–203), and others are readily accessible in a manner which is known per se. The compounds II which are preferably employed, where Z is arylene and X is O, are obtained, for example, by reacting 2 mol of hexafluoroacetone with a diamide of the formula IV

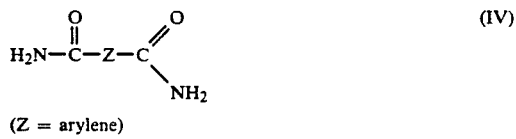

(IV)

(Z = arylene)

to give compounds of the formula V

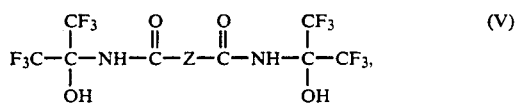

(V)

subsequently converting these, with dehydration, into compounds of the formula VI

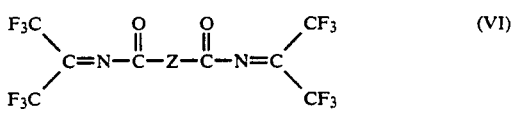

(VI)

and finally cyclizing these to give the desired compounds II.

The reaction of hexafluoroacetone with the diamide IV is advantageously carried out in strongly polar organic solvents, for example dimethyl sulfoxide, from which the product V is isolated by precipitation with water.

The dehydration is carried out with cooling, preferably at temperatures of 0°(−40)° C., for example with the aid of pyridine/trifluoroacetic anhydride.

The cyclization of the acylimine groups in VI to give II is advantageously carried out with anhydrous tin(II) chloride in boiling toluene.

Carbonic acid amides of the formula IV may be obtained from the corresponding dicarbonic acids $Z(COOH)_2$. Azodicarbonicamide ($H_2N$—CO—N=N—CO—$NH_2$), acetylenic dicarbonic acid (OH—CO—C≡C—CO—OH), perfluoradipinic acid and perfluoro succinic acid as well as different pyridine carbocylic acids are commercially available and may be converted into the diamides by methods well known in the art. Other dicarbonic acids (e.g. different furane dicarbonic acids) are described in the chemical literature.

The dihydroxy compounds of the formula III are widely known. Preferred dihydroxy compounds are compounds of the formula IIIa

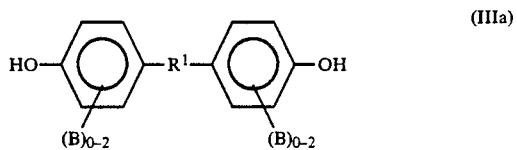

(IIIa)

in which $R^1$ is $CH_2$, O, CO, $SO_2$, $C(CH_3)_2$, $C(CF_3)_2$, phenylene,

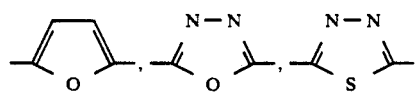

and B is halogen, in particular Cl, F or Br, or $C_1$–$C_4$-alkyl and the individual phenylene rings are substituted by 0, 1 or 2 groups B.

The radicals B are preferably in the 3- or 3,5-position relative to $R^2$. Particularly preferred compounds of the formula IIIa are those in which B is H and $R^1$ is $CH_2$, CO, $C(CH_3)_2$ or $C(CF_3)_2$.

Up to 5 mol % of a chain stopper (based on diphenols) can be added to limit the molecular weight of the polymers obtained and to close the chain ends by aryloxy groups. Chain stoppers which are preferably used are phenol or substituted phenols, hydroxydiphenyl or naphthols, in amounts of 0.01 to 5 mol % (based on diphenols). The molecular weight can moreover be controlled by the temperature program.

The polymers according to the invention are amorphous and in general have glass transition temperatures of 120° C. to 170° C. Some of them may suffer a weight loss at temperatures above 280° C. under air or nitrogen, this being accompanied by an uptake of energy (endothermic reaction).

The heteroaromatic polyethers according to the invention are readily soluble in various organic solvents, such as acetone, ethyl acetate, tetrahydrofuran, toluene and chloroform, and are thus distinguished by a considerably improved solubility compared with known polymers. The polyethers according to the invention can be used in the most diverse manner. Some possible uses are, for example, 1) as a thermoplastic for the production of injection-molded articles and extrudates, for example for bars, tubes, fibers and films
2) production of coatings, for example from solution
3) production of films and membranes from solution
4) production of polymer blends with polyarylenes (polyether ketones, polyether sulfones, polyethers, polysulfones), polyamides (polyaramides, partially aromatic polyamides, nylon 6, nylon 6,6), polyesters (®Durel, PET, PDT), polyolefins (PP, PE, cycloolefin copolymers), vinyl polymers (polystyrene, poly($\alpha$-methylstyrene), PMMA, polyacrylonitrile) and polycarbonates (for example based on bisphenol A).

The invention is illustrated by the following examples.

The molecular weights were determined in relation to commercially obtainable polystyrene standards using a gel permeation chromatograph from Waters-Millipore, Eschborn, Federal Republic of Germany, model 150-C.

The glass transition temperature ($T_G$) was determined by means of a differential calorimeter DSC7 from Perkin Elmer, Überlingen, Federal Republic of Germany, at a heating-up rate of 20° C./minute.

The dihydroxy compounds used in the examples have the formulae:

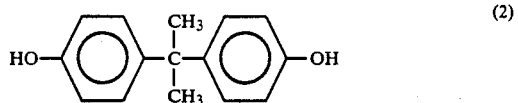

(2)

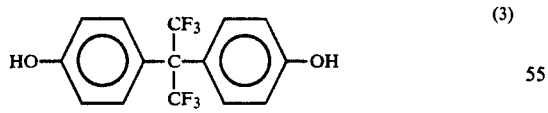

(3)

EXAMPLE 1

622 mg (1.6 mmol) of monomer of the formula 1 and 369 mg (1.6 mmol) of bisphenol A (see formula 2) are dissolved in 12 ml of absolute dimethyl sulfoxide. 388 mg (3.86 mmol) of tri-ethylamine are added to form the phenolate in situ and to trap the hydrogen fluoride formed during the polymerization. The mixture is heated at 80° C. for 3 hours in a closed vessel. Towards the end of the reaction, the polymer precipitates. After the reaction, the polymer is filtered off, dissolved in toluene, precipitated from methanol and then dried. The product has a molecular weight $M_w = 124,000$ g/mol. Its glass transition temperature is 150° C.

EXAMPLE 2

427 mg (1.1 mmol) of monomer of the formula 1 and 373 mg (1.1 mmol) of hexafluorobisphenol A (see formula 3) are dissolved in 10 ml of absolute dimethyl sulfoxide. 267 mg (2.64 mmol) of triethylamine are added as a base to form the phenolate in situ and to trap the hydrogen fluoride which is formed during the polymerization. The mixture is heated at 140° C. for 2 hours in a closed pressure-resistant vessel. On cooling when the reaction has ended, the polymer precipitates. It is dissolved in toluene, precipitated from methanol and dried. The product has a molecular weight of $M = 17,600$ g/mol, and its glass transition temperature is 147° C.

EXAMPLE 3

Preparation of the monomer of the formula 1

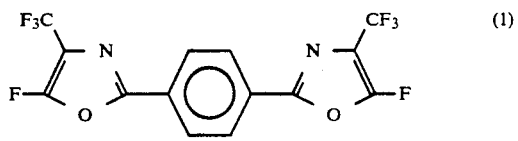

(1)

a) Hexafluoroacetone is passed onto a suspension of 16.4 g (100 mmol) of terephthalic acid diamide in 250 ml of absolute dimethyl sulfoxide at room temperature in an apparatus provided with a dry ice reflux condenser and pressure relief valve, while stirring vigorously. When the absorption of gas has ended, the reaction mixture is poured onto 300 ml of water, whereupon the product precipitates. (This step represents a considerable improvement compared with the known process (K. Geith, Dissertation 1988, TU Munich), according to which the product is extracted from aqueous dimethyl sulfoxide with a large excess of methylene chloride, since the novel process renders yields of >95% possible, compared with <70% in the known process). The product is filtered off, washed several times with distilled water in order to remove residual dimethyl sulfoxide, and finally dried under reduced pressure (<1 bar) over phosphorus pentaoxide. Yield: >95%, colorless crystals, decomposition >265° C.

b) 15 g (30 mmol) of the product from a) are dissolved in 250 ml of absolute ether. 8.4 ml (60 mmol) of trifluoroacetic anhydride and 9.8 ml (120 mmol) of pyridine are then simultaneously added dropwise at −10° C. (ice/sodium chloride freezing mixture) in the course of one hour. The reaction batch is stirred at 0° C. for a further hour and then left to stand at a temperature of −30° C. for two days. The pyridinium trifluoroacetate which has precipitated is then filtered off, the solvent is stripped off under reduced pressure (<1 bar) and the residue is taken up in hexane. The hexane solution is filtered and concentrated. The product crystallizes out at −30° C. Yield: 52%, colorless crystals, melting point: 78° C.

c) 6.9 g (15 mmol) of the product from b) are dissolved in 70 ml of absolute toluene, 5.7 g [30 mmol] of anhydrous tin(II) chloride are added and the reaction mixture is heated under reflux for 48 hours. When the reaction has ended, the insoluble residue is filtered off and the solvent is removed in vacuo. The crude product is first purified by column chromatography and then recrystallized from chloroform. Yield: 40%, yellowish crystals, melting point: 149° C.

EXAMPLE 4

635.2 mg (1.65 mmol) of monomer of the formula 1 and 413.7 mg (1.65 mmol) of 4,4,-dihydroxydiphenyl sulfone are dissolved in 6 ml of absolute N-methylpyrrolidone (NMP). 0.6 ml of absolute triethylamine is added to form the phenolate and to trap the hydrogen fluoride formed during the polymerization. The reaction mixture is then heated at 50° C. for 20 hours in a closed pressure-resistant vessel. Thereafter, the mixture is diluted with 10 ml of tetrahydrofuran and the polymer is precipitated by pouring the mixture into methanol. The polymer is filtered off, washed with methanol and water and dried to constant weight in vacuo at 80° C. The polymer thus obtained is pale yellow in color. It is soluble in dimethyl sulfoxide, NMP, dimethylacetamide and tetrahydrofuran at room temperature. Its molecular weight is $\overline{M}_n=18{,}500$ g/ mol or $\overline{M}_w=64{,}000$ g/mol (gel permeation chromatography with polystyrene calibration). The glass transition temperature is $T_g=190°$ C. (heating-up rate 10 K/minute). In the thermogravimetric measurement, the polymer starts to lose weight at 319° C. in air (heating-up rate 10 K/minute), this being accompanied by a release of energy (exothermic reaction).

EXAMPLE 5

634.0 mg (1.65 mmol) of monomer of the formula 1 and 353.5 mg (1.65 mmol) of 4,4,-dihydroxybenzophenone are dissolved in 6 ml of absolute NMP (=N-methylpyrrolidone). 0.6 ml of absolute triethylamine is added to form the phenolate and to trap the hydrogen fluoride formed by the reaction. This mixture is heated at 50° C. for 7 hours. Thereafter, it is diluted with 10 ml of NMP and the polymer is precipitated by pouring the mixture into methanol. The polymer is filtered off, washed with methanol and water and dried to constant weight in vacuo at 80° C. The polymer thus obtained is pale yellow in color. It is soluble in NMP and dimethylacetamide at elevated temperature. Its glass transition temperature is $T_g=167°$ C. (heating-up rate 20 K/minute). In addition, it has a crystallite melting point of $T_m=278°$ C. The polymer starts to lose weight at 310° C. in air (heating-up rate 10 K/minute) in an exothermic reaction.

EXAMPLE 6

646.7 mg (1.68 mmol) of monomer of the formula 1 and 384.1 mg (1.68 mmol) of bisphenol A are dissolved in 6 ml of absolute N,N-dimethylacetamide (DMAc). 0.6 ml of absolute triethylamine is added to form the phenolate and to trap the hydrogen fluoride formed during the reaction. This mixture is heated at 50° C. for 20 hours in a closed pressure-resistant vessel. The mixture is then diluted with 10 ml of tetrahydrofuran and the polymer is precipitated by pouring the mixture into methanol. The polymer is filtered off, washed with methanol and water and dried to constant weight in vacuo at 80° C. The polymer thus obtained is yellow in color. It is soluble in acetone, chloroform, NMP, DMAc, tetrahydrofuran and toluene at room temperature. Its molecular weight is $\overline{M}_n=9500$ g/mol or $\overline{M}_w=19{,}000$ g/mol (gel permeation chromatography with polystyrene calibration). The glass transition temperature is $T_g=143°$ C. (heating-up rate 20 K/minute), and in thermogravimetry the polymer starts to lose weight at 300° C. in air (heating-up rate 10 K/minute), during which an exothermic reaction proceeds.

EXAMPLE 7

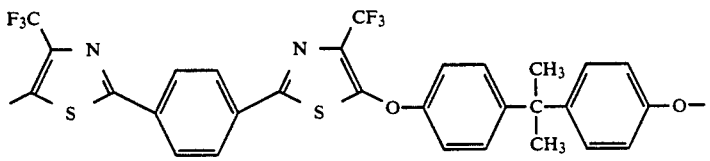

679.8 mg (1.63 mmol) bis-(4-fluor-5-trifluormethyl-thiazolyl)-phenylen and 372.6 mg (1.63 mmol) bisphenol A are dissolved in 6 ml absolute dimethyl sulfoxide (DMSO). To form the phenolate and to neutralize the hydrofluoric acid developed 0.6 ml absolute triethylamine are added The mixture is heated in a pressure proof vessel for 2 hours at 100 ° C. The mixture is cooled and diluted with 5 ml tetrahydrofurane (THF). The polymer is precipitated by pouring the mixture into methanol. The product is removed by filtration, washed with methanol and dried in vacuo at 80° C. It is soluble at room temperature in THF and DMSO. Molecular weight $\overline{M}_w=3500$ g/mol (SPC with polystyrene calibration).

What is claimed is:

1. A polyether containing recurring units of the formula I

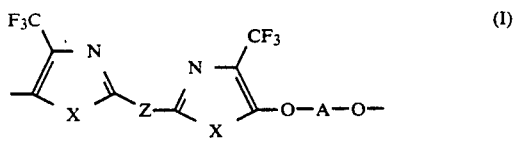

(I)

in which
 A is a divalent arylene or heteroarylene radical,
 X is O, S or NR,
 Z is a divalent aryl or heteroaryl radical or the ethinylene, azo or $(CF_2)_n$ group, wherein n is an integer from 1 to 4, and
 R is aryl.

2. The polyether as claimed in claim 1, in which A is 1,2-, 1,3- or 1,4-phenylene, 2,6-naphthylene or a ring-alkylated or ring-halogenated derivative thereof,

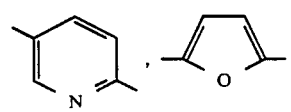

or a structural unit of the formula

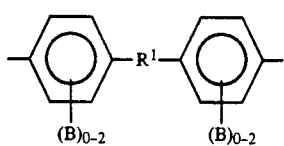

in which $R^1$ is $CH_2$, O, CO, $SO_2$, $C(CH_3)_2$, $C(CF_3)_2$, phenylene,

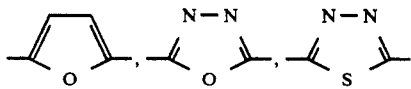

or A is a structural unit of the formula

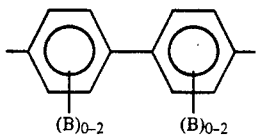

wherein B is halogen or $C_1$-$C_4$ alkyl, X is O, and Z is

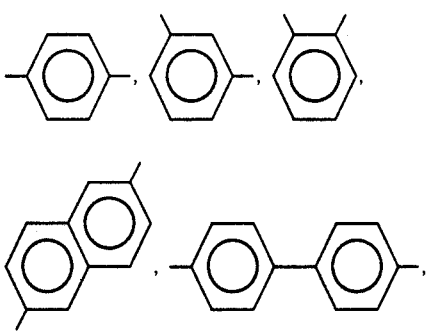

-continued

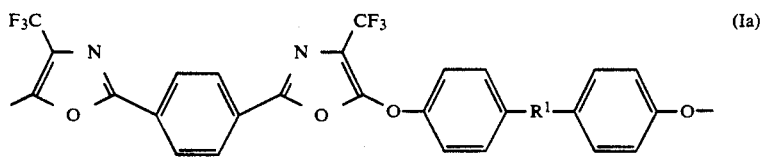

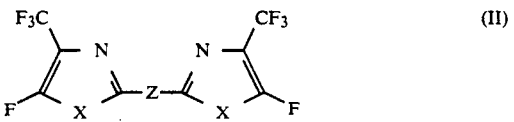

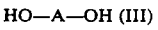, $-C\equiv C-$ (=Ethinylen), $-N=N-$, or $-(CH_2)_{1-4}-$, where $R^2$ is $CH_2$, O, CO, $SO_2$, $C(CH_3)_2$ or $C(CH_3)_2$.

3. The polyether as claimed in claim 1, containing recurring units of the formula Ia $$\text{(Ia)}$$

(structure shown)

in which $R^1$ is $CH_2$, CO, $C(CH_3)_2$ or $C(CF_3)_2$.

4. A process for the preparation of a polyether as claimed in claim 1, which comprises subjecting a halogen compound of the formula II $$\text{(II)}$$

(structure shown)

in which X and Z have the abovementioned meaning, to a polycondensation reaction with a dihydroxy compound of the formula III $$HO-A-OH \quad (III)$$

in which A has the abovementioned meaning, in the presence of a base.

5. The process as claimed in claim 4, wherein the base is trialkylamine.

6. The polyether as claimed in claim 1, wherein R is phenyl.

7. The polyether as claimed in claim 2, wherein B is selected from the group consisting of Cl and Br.

8. The polyether as claimed in claim 2, wherein B is $CH_3$.